United States Patent
Cornic et al.

(10) Patent No.: US 10,571,549 B2
(45) Date of Patent: Feb. 25, 2020

(54) RECEIVING DEVICE FOR AN ELECTRONICALLY SCANNED ANTENNA, SAID DEVICE BEING ABLE TO OPERATE IN RESM AND RADAR MODE, AND RADAR EQUIPPED WITH SUCH A DEVICE

(71) Applicant: THALES, Courbevoie (FR)

(72) Inventors: Pascal Cornic, Brest (FR); Patrick Garrec, Pessac (FR); Richard Montigny, Pessac (FR)

(73) Assignee: THALES, Courbevoie (FR)

( * ) Notice: Subject to any disclaimer, the term of this patent is extended or adjusted under 35 U.S.C. 154(b) by 260 days.

(21) Appl. No.: 15/799,446

(22) Filed: Oct. 31, 2017

(65) Prior Publication Data

US 2018/0128899 A1 May 10, 2018

(30) Foreign Application Priority Data

Nov. 10, 2016 (FR) ...................................... 16 01601

(51) Int. Cl.
| | | |
|---|---|---|
| *G01S 7/02* | (2006.01) | |
| *G01S 7/03* | (2006.01) | |
| *G01S 7/285* | (2006.01) | |
| *G01S 13/02* | (2006.01) | |

(52) U.S. Cl.
CPC .............. *G01S 7/021* (2013.01); *G01S 7/032* (2013.01); *G01S 7/285* (2013.01); *G01S 13/02* (2013.01); *G01S 2013/0254* (2013.01)

(58) Field of Classification Search
CPC .......... G01S 7/021; G01S 13/02; G01S 7/285; G01S 7/032; G01S 2013/0254

USPC .......................................................... 342/195
See application file for complete search history.

(56) References Cited

U.S. PATENT DOCUMENTS

| | | | | |
|---|---|---|---|---|
| 4,879,561 A | * | 11/1989 | Inkol | G01S 7/021 |
| | | | | 342/195 |
| 5,952,947 A | * | 9/1999 | Nussbaum | H03M 3/392 |
| | | | | 341/143 |
| 2007/0090988 A1 | * | 4/2007 | Beharrell | G01S 7/021 |
| | | | | 342/13 |
| 2018/0128899 A1 | * | 5/2018 | Cornic | G01S 7/021 |

FOREIGN PATENT DOCUMENTS

| | | |
|---|---|---|
| EP | 2 182 375 A1 | 5/2010 |
| FR | 2 972 808 A1 | 9/2012 |
| FR | 2 988 858 A1 | 10/2013 |

(Continued)

OTHER PUBLICATIONS

Written Opinion on patentability on FR1601601, French Patent Office, dated Jul. 7, 2017 (Year: 2017).*

(Continued)

*Primary Examiner* — Frank J McGue
(74) *Attorney, Agent, or Firm* — Baker & Hostetler LLP

(57) ABSTRACT

A receiving device comprises an analogue reception filter designed for a given frequency band included in the entire operating band of radar, the device further comprising a digital filter able to separate the received signals depending on their frequency, one portion of the frequency band of the given frequency band allocated to the radar reception function and another portion allocated to an RESM reception function.

15 Claims, 5 Drawing Sheets

(56) References Cited

FOREIGN PATENT DOCUMENTS

GB        2 250 152 A      5/1992

OTHER PUBLICATIONS

A.G. Huizing et al., "Compact Scalable Multifunction RF Payload for UAVs with FMCW Radar and ESM Functionality," Jan. 1, 2009, XP055385065.
Stephane Kemkemian et al., "Toward common radar & EW multifunction active arrays," 2010 IEEE International Symposium on Phased Array Systems and Technology, Oct. 12, 2010, pp. 777-784, XP031828584.

* cited by examiner

RECEIVING DEVICE FOR AN ELECTRONICALLY SCANNED ANTENNA, SAID DEVICE BEING ABLE TO OPERATE IN RESM AND RADAR MODE, AND RADAR EQUIPPED WITH SUCH A DEVICE

CROSS-REFERENCE TO RELATED APPLICATION

This application claims priority to foreign French patent application No. FR 1601601, filed on Nov. 10, 2016, the disclosures of which are incorporated by reference in their entirety.

FIELD OF THE INVENTION

The present invention relates to a receiving device for an electronically scanned antenna, said device being able to operate in radar mode and in radar electronic support measures (RESM) mode. It also relates to a radar equipped with such a device.

BACKGROUND

A technical problem to be solved for such an active-antenna radar is that of providing it with passive RESM listening means that operate in the emission band of the radar without increasing the volume occupied by its electronics and, in particular, while using the same receiver to simultaneously or sequentially provide the electronic support measures (ESM) and radar functions.

The same problem may arise in the field of communication emitters and receivers performing a communications electronic support measures (CESM) function.

Currently, RESM and radar equipment are separate. It is sometimes possible to share the same antennae to perform two functions but this is possible only with:

different receiving means;

or sharing of time between the two functions, this causing a loss in performance in each of the radar or ESM functions, in particular as regards the probability of interception.

In these two cases, the overall cost is high and integration of the two pieces of radar and ESM equipment may be difficult, in particular for an on-drone or on-helicopter airborne application.

Moreover, the RESM receiver cannot listen while the radar is emitting, because it would be saturated by this emission.

SUMMARY OF THE INVENTION

One aim of the invention is to solve the aforementioned problem, in particular by allowing ESM and radar signals to be processed simultaneously. To this end, one subject of the invention is a receiving device for an electronically scanned antenna-array radar, including an analogue reception filter designed for a given frequency band included in the entire operating band of said radar, said device furthermore implementing digital filtering able to separate the received signals depending on their frequency, one portion of the frequency band of said given frequency band being allocated to the radar reception function and another portion being allocated to an RESM reception function.

Said given frequency band is for example the entire operating band of said radar.

In one possible embodiment, said antenna being divided into sub-arrays, the device includes a plurality of reception channels, each of said reception channels being associated with one sub-array of said antenna.

Said reception channels are for example combined to form independent reception antenna beams for the radar function and RESM function. Said beams formed for the radar function and for the RESM function are for example identical and point in the same direction.

The RESM reception function is for example simultaneously provided in different polarizations by various sub-arrays of said antenna.

Various sub-arrays of said antenna are for example assigned to different frequency sub-bands of the RESM reception function.

At least one sub-array of said antenna is for example able to be deactivated receptionwise in order to widen the instantaneous field of coverage of the RESM reception function, said at least one sub-array being deactivated by deactivating the reception channel that is associated therewith.

The antenna array consisting of radiating elements that are associated with active modules, the active modules of a plurality of sub-arrays of said antenna are for example able to be deactivated receptionwise in order to allow an interferometry base to be created for measuring the directions of arrival of signals in the RESM reception function, a sub-array being deactivated by deactivating the reception channel that is associated therewith.

The radiating elements of the sub-arrays associated with the remaining active modules are for example grouped in columns and/or in rows.

In one possible embodiment, in each reception channel associated with a sub-array of said antenna, said device includes at least:

in the analogue domain, a low-noise amplifier, a filter designed for said given frequency band, and an analogue-digital converter; and in the digital domain, a digital filter designed for the instantaneous frequency band of the reception function and a digital filter covering the available remainder of said given frequency band, the input signals of said digital filters being output from said analogue-digital converter.

Said device for example includes for each reception channel, circuits for transposing the frequency of the received signals upstream of the analogue converting circuit.

Each analogue reception channel is for example integrated into a module furthermore including an emission channel that is also associated with said sub-array.

Said digital filters are for example implemented via the processing means of said radar.

The radar reception function and the RESM reception function may be performed simultaneously.

Another subject of the invention is a radar equipped with a device such as described above.

BRIEF DESCRIPTION OF THE DRAWINGS

Other features and advantages of the invention will become apparent from the following description, which is given with reference to the appended drawings, which show.

DETAILED DESCRIPTION

Figure 1:
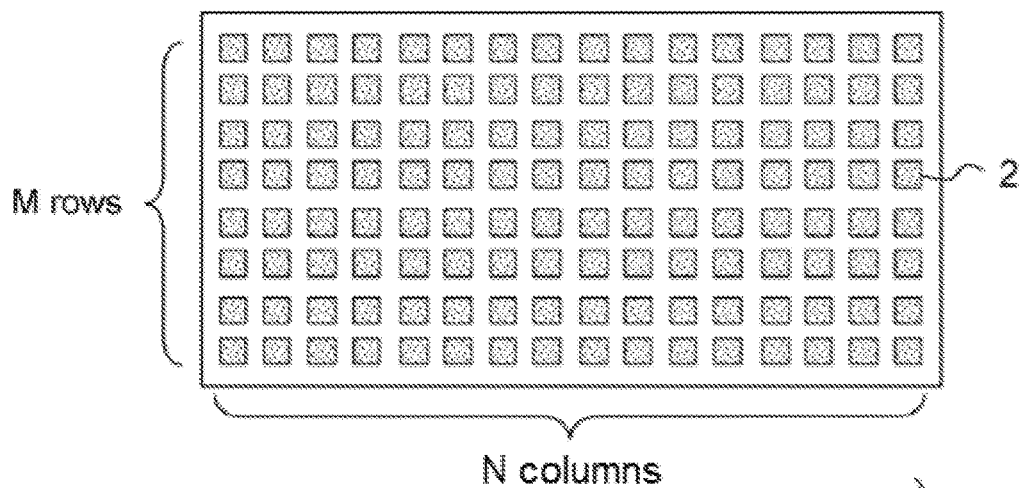
FIG. 1, a simplified diagram of an antenna array, associated with active modules.

FIG. 1 shows a simplified diagram of an electronically scanned antenna array 1 associated with active modules, the antenna including M rows and N columns of radiating elements 2. As a general rule, M and N are relatively high, this corresponding to a directive antenna.

Below, a radar equipped with this type of antenna will be considered.

In such an antenna, depending on the desired domain of angular coverage, the radiating elements are connected either individually or in groups to an active module performing the emission function and the reception function with the associated phase shift allowing the emission and reception antenna beams to be pointed.

Figure 2:
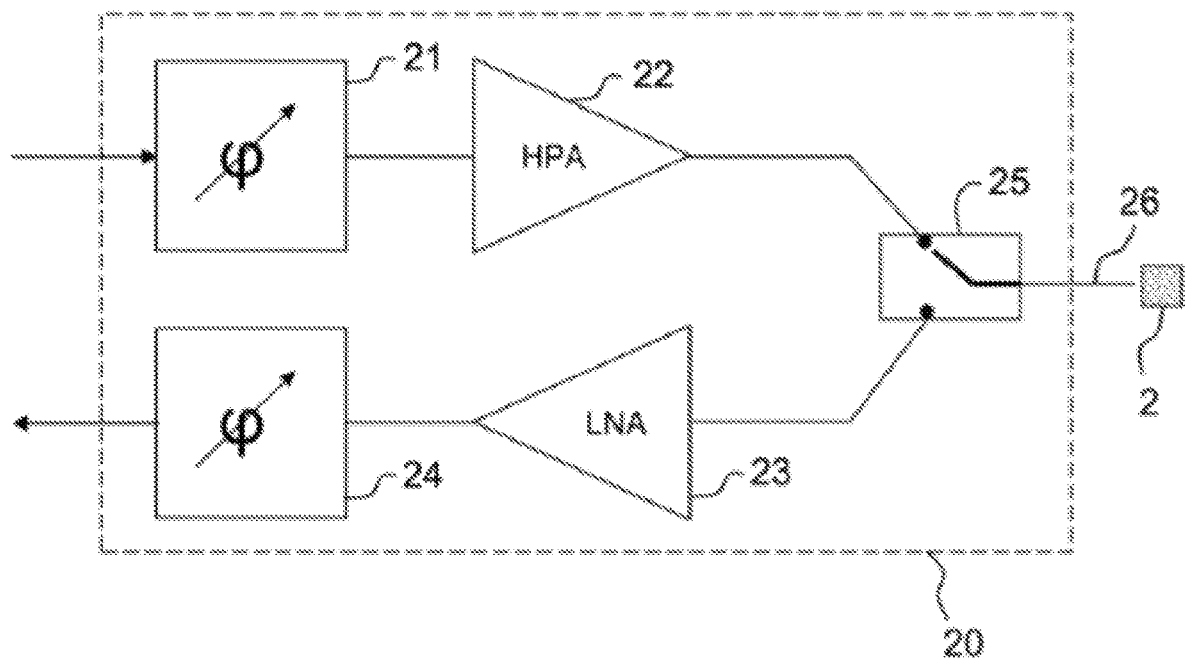
FIG. 2, an active module able to be coupled to a radiating element, or to a sub-array, of an electronically scanned antenna array.

FIG. 2 shows a simplified diagram of an active module coupled to a radiating element 2 of the antenna. The module includes an emission channel comprising at least one phase shifter 21 and a power amplifier 22 that amplifies the input signal. The reception channel includes a low-noise amplifier 23 and a phase shifter 24. A switching device 25 allows the emission channel or reception channel to be switched to the input/output 26 of the module, which is connected to the radiating element 2. This device is for example a microwave circulator guiding the waves from the emission channel to the input/output 26 and guiding, on reception, waves entering via the input/output 26 to the reception channel.

The various modules 20 composing the emitting and receiving system are controlled using a digital data bus (not shown) that in particular allows, in a known way, the emission channel and reception channel to be activated and the gain of the amplifiers and the phase shift on emission and on reception to be managed.

On reception, the various signals generated by the active modules are conventionally summed in the analogue domain, generally at an intermediate frequency that is offset with respect to the emission frequency, in order to form a plurality of reception channels that are then digitised and processed in a digital receiver.

Figure 3:
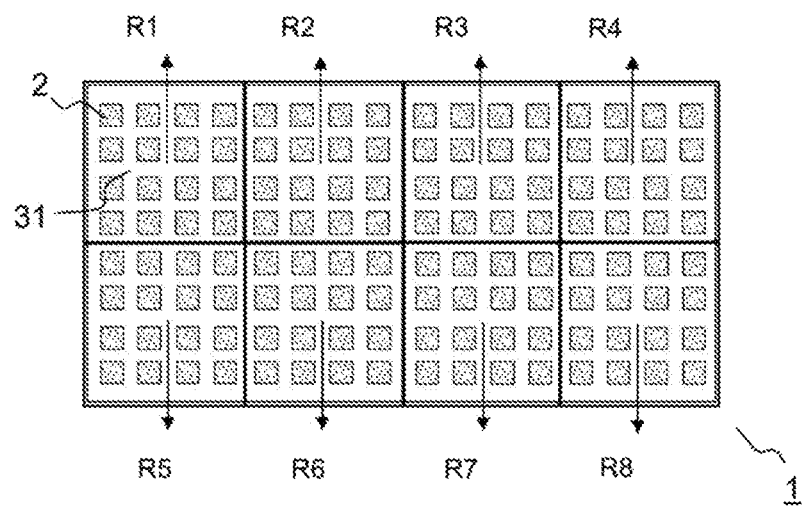
FIG. 3, and antenna array divided into N sub-arrays, N being equal to 8.

FIG. 3 illustrates this receiving principle for an antenna including 8 reception channels R1, R2, R3, R4, R5, R6, R7, R8 associated with 8 identical antenna sub-arrays 31. In this example embodiment, one active module 20 is connected to all the elements 2 of a sub-array. The reception signals output from the active modules are grouped by analogue summation of the signals of each sub-array, leading to 8 analogue reception channels in the case of FIG. 3, corresponding to the 8 antenna sub-arrays. In other words, reception beams are formed partially in the analogue domain and partially in the digital domain.

The emitting and receiving system then includes 128 active modules. In conformity with the above principle, the signals output from the 8 reception channels R1, R2, R3, R4, R5, R6, R7, R8 are summed.

Conventionally, the bandwidth of a radar receiver employing an intermediate frequency is set depending on the instantaneous bandwidth ΔF of the radar pulses, in correspondence with the sought distance resolution. This is particularly the case for pulse radar, whether employing pulse compression or not.

For example, for a distance resolution Δr equal to 1 m, the passband is:

$$Bp = \Delta F = C/2\Delta r, \text{ i.e. 150 MHz}$$

In the particular case where the deramping technique (corresponding to the demodulation of a frequency ramp with another ramp) is used for reception (which is the case in FMCW radars), the passband is even narrower, because it is limited by the maximum range Dmax, of the radar, namely:

$$Bp = \Delta F/T 2 D\text{max}/C, \text{ where T is the duration of the radar pulse.}$$

As a result, the instantaneous reception band of a radar receiver is often much narrower than the potential operating band of this radar.

Figure 4:
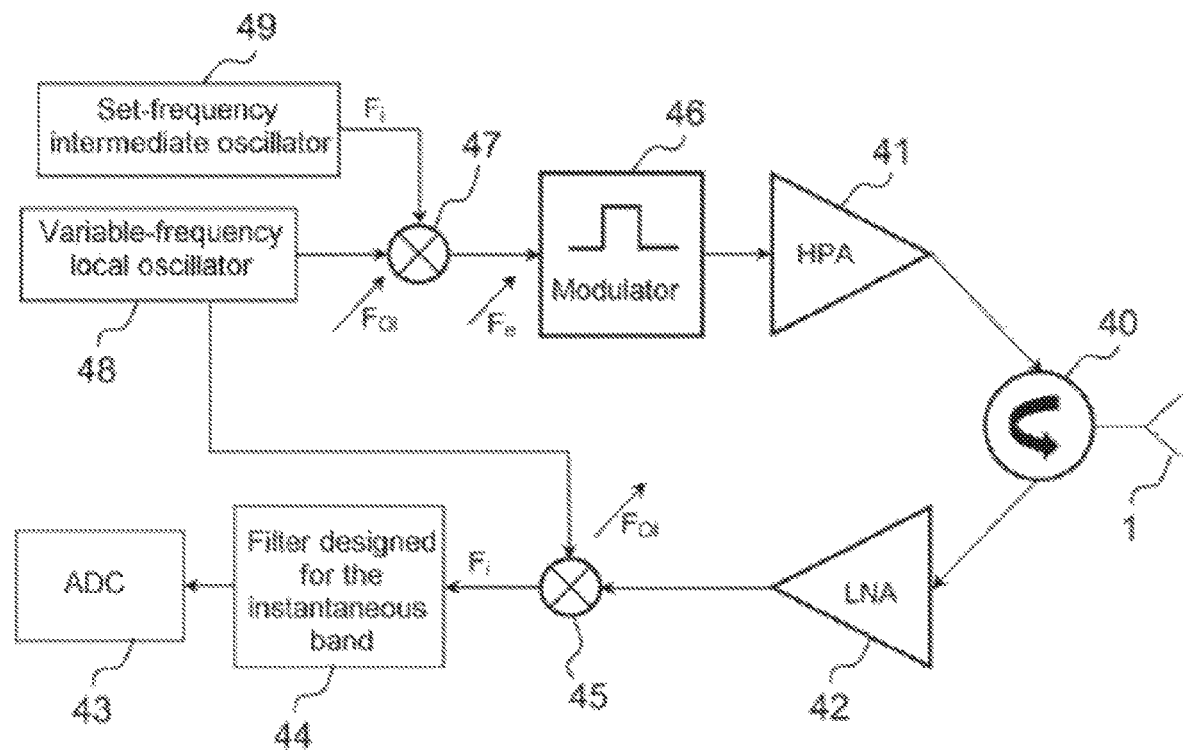
FIG. 4, an emitting and receiving system able to be coupled to said antenna array or to a sub-array thereof.

FIG. 4 illustrates a conventional solution found in a radar, the received signal being transposed to a set intermediate frequency before being filtered in an analogue filter designed for the instantaneous reception band, then digitised.

In such a system, the received signal is demodulated by a local oscillator signal the frequency of which is automatically controlled to the emission frequency. FIG. 4 shows an example embodiment in the case of a single reception channel.

The emitting and receiving system is connected to the antenna 1 via a microwave circulator 40 (or an emission/reception switch). The variable emission waveform is generated by:

a waveform generator set to the intermediate frequency, and more particularly by an oscillator 49 of set frequency equal to the intermediate frequency Fi used for reception;

and a variable-frequency waveform generator, and more particularly by an oscillator 48 variable frequency Foi.

The emission waveform Fe is obtained by combining these two waveforms Fi, Foi by means of a mixer 47. The wave Fe is then conventionally modulated by a modulator 46, which for example applies a phase shift. A modulator (not shown) for example applies a phase shift on reception like the circuit 24 of FIG. 2

Lastly, the signal is amplified by a power amplifier 41 before being transmitted to the antenna 1 via the circulator 40.

The reception channel includes a low-noise amplifier 42 connected to the output of the circulator 40, and which thus receives the signals received by the antenna. The reception signal output from the modulator is transposed to the intermediate frequency Fi by means of a second mixer 45. The latter reconstructs the intermediate frequency from the emission waveform Fi+Foi contained in the reception signal and from the form of the variable signal Foi transmitted by the variable-frequency oscillator 48. After being output from the mixer, the reception signal transposed to the intermediate frequency is filtered by a filter 44 designed for the instantaneous emission band of the radar. The filtered signal is then converted into the digital domain by an analogue-digital converter 43.

Figure 5:
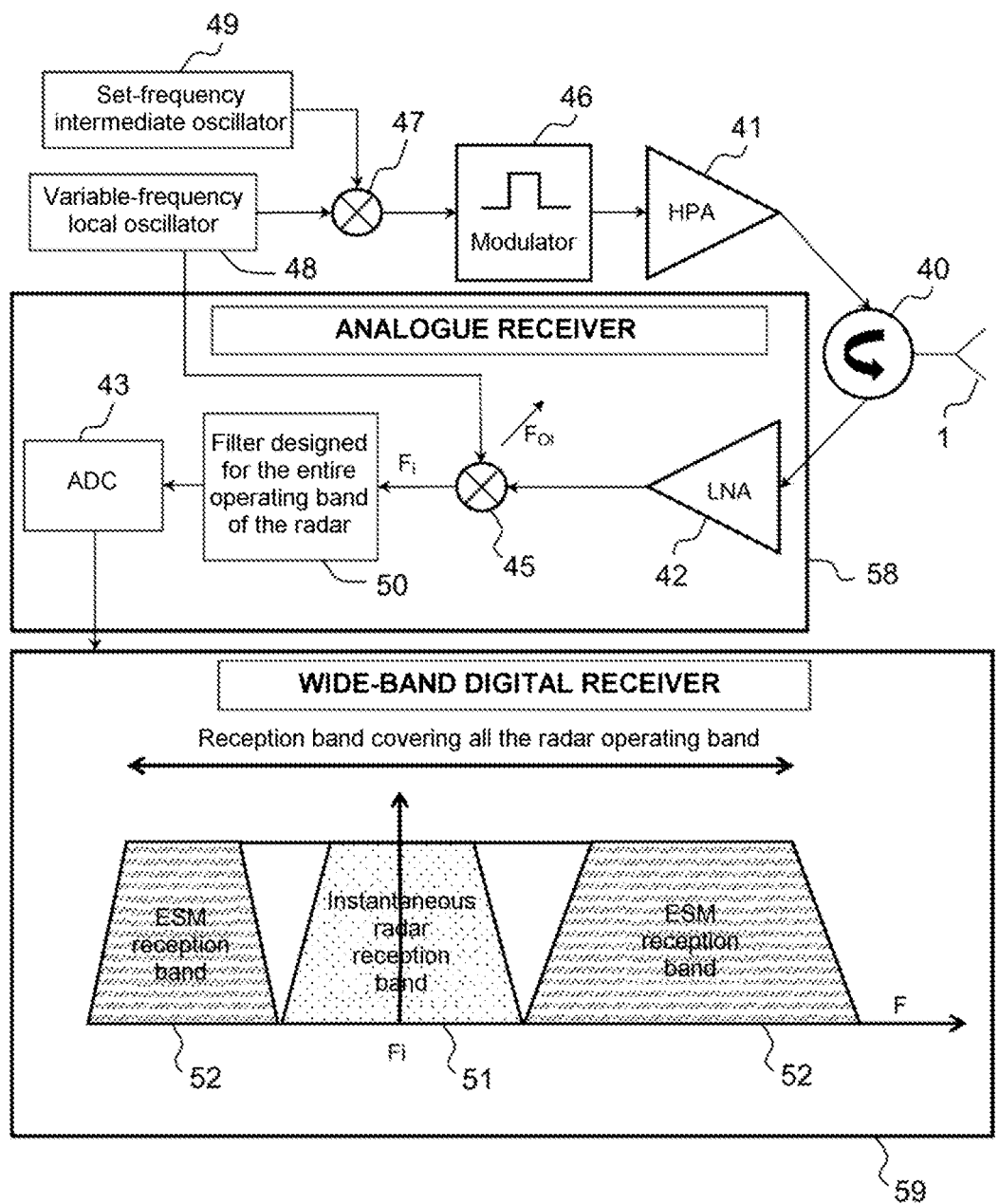
FIG. 5, an illustration of the operating principle of a receiving device according to the invention.

FIG. 5 illustrates the operating principle of a device according to the invention, which is presented by way of example in a case of application to a single reception channel. To demonstrate the contribution of the invention, the example of FIG. 4 is reused modified by the invention.

The invention judiciously exploits the fact that the instantaneous reception band of a radar receiver is generally narrower than the potential operating band of this radar. Thus, the invention consists:

firstly, in replacing the reception filter 44 with a filter 50 the passband of which is equal to the entire operating band of the radar, then in digitizing the signal over the entirety of this band; and secondly, in implementing, in the digital domain, a first filter 51 designed for the instantaneous frequency band of the radar and a second filter 52 covering the remainder of the available band for the reception of ESM signals.

Starting with the emitting and receiving system of FIG. 4, the emission channel remains unchanged. It is still connected to the antenna 1 via the microwave circulator 40. The reception channel is the same except for the filter 50, which is now designed for the entire operating band of the radar. This analogue reception channel 58 is complemented with a digital reception channel 59 composed of a digital filter 51 designed for the instantaneous band of the radar and a digital filter 52 covering the remainder of the entire operating band, which remainder is assigned to the reception of ESM signals. The analogue-digital converter 43 forms the junction between the analogue channel 58 and the digital channel 59, the digitised reception signal being the input signal of the digital channel.

The positions and widths of the filters 58, 59 are modified dynamically depending on the context. In other words, the wide-frequency-band digital reception channel dynamically separates, via digital filtering, the received signals depending on their frequency, a limited portion of the frequency band being allocated to the reception of the radar function and another portion of the band being allocated to RESM reception, depending on the mission context.

Typically, for a radar operating in the X band over a possible band of 2 GHz, if the distance resolution is 1 metre, an instantaneous frequency band of 150 MHz may be allocated to the radar reception, and 1850 MHz to the ESM function. The two, radar and ESM, functions may thus be performed simultaneously.

Depending on the context and the operational requirements, the radar or ESM may alternatively, i.e. either one, be master of the frequency plane. What is meant when a radar or ESM function is said to be master of the frequency plane is that the position and bandwidth of this function sets the position and bandwidth of the other function.

It is of course still possible to deactivate the radar function or the ESM function.

In the case where the radar mode is deactivated, the ESM function may make use of all of the reception band.

In the case of an electronically scanned active antenna, the operating principle described in FIG. 5 applies to each of the parallel reception channels.

It is then possible to simultaneously produce, via computational beamforming, beams that are identical or different in the ESM or radar reception bands.

Figure 6:
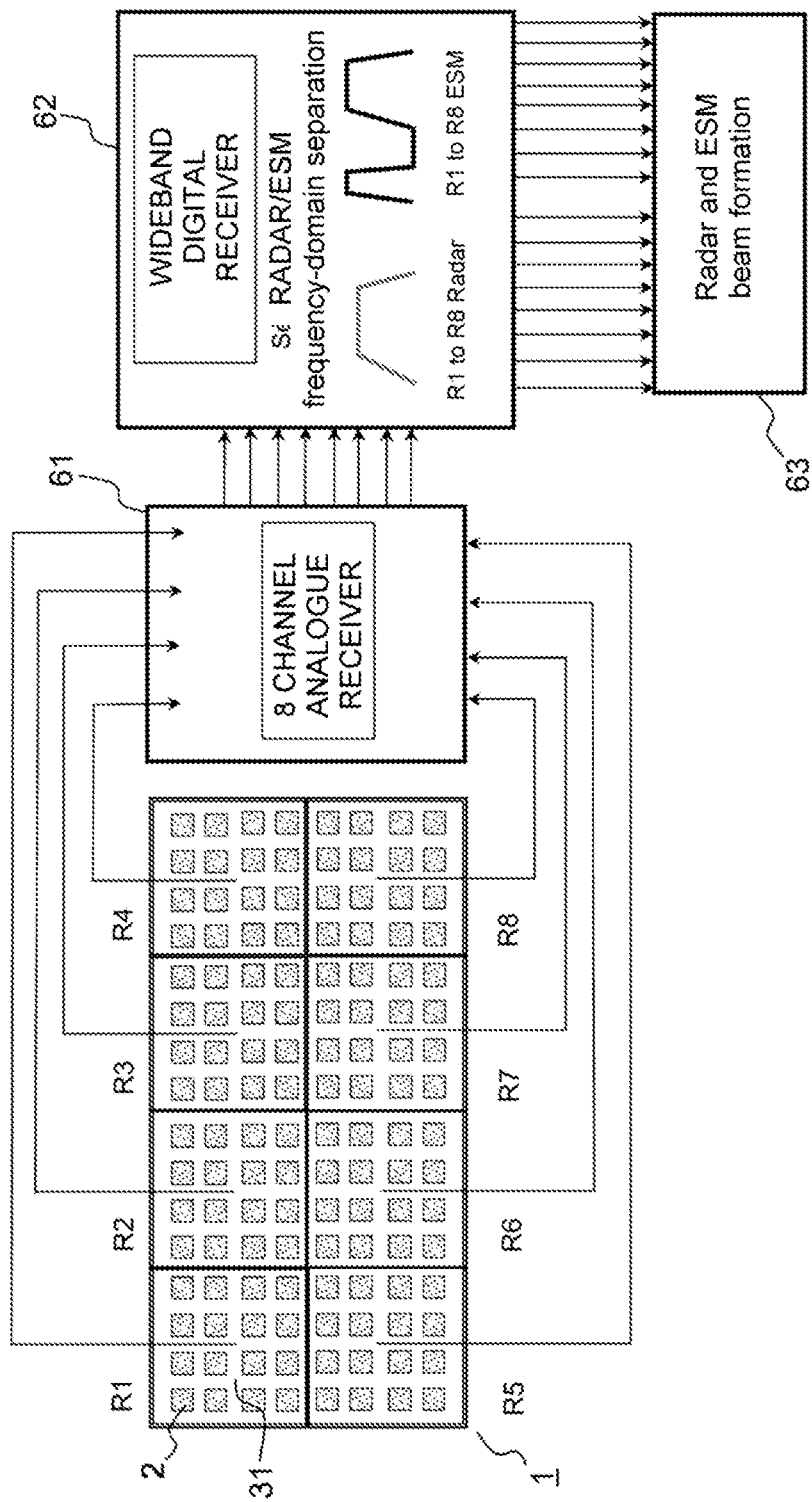
FIG. 6, the sub-arrays of the example of FIG. 3 coupled to a receiving device according to the invention.

FIG. 6 shows an example of an embodiment of a receiving device according to the invention, including 8 reception channels associated with 8 antenna sub-arrays 31 that together form the antenna 1, which is of the same type as that shown in FIG. 3.

FIG. 6 only shows the receiving portion of the emitting and receiving system, the emitting portion being unchanged with respect to the prior art, one emission channel being associated with each antenna sub-array.

An analogue receiver 61 includes 8 analogue reception channels of the same type as that of 58 shown in FIG. 5, each including at least one low-noise amplifier, a filter designed for the entire operating frequency band of the radar and an analogue-digital converter.

The analogue receiver 61 delivers 8 analogue reception signals that are the input data of a wideband digital receiver 62 composed of 8 digital reception channels of the same type as that 59 shown in FIG. 5.

Each digital channel includes a digital filter designed for the instantaneous radar reception band and a digital filter covering the remainder of the entire operating band, which remainder is assigned to the ESM function.

The digital receiver 62 includes 2×8 outputs, 8 outputs corresponding to the outputs of the 8 filters assigned to the radar function, each corresponding to one of the 8 antenna sub-arrays R1, R2, R3, R4, R5, R6, R7, R8, and 8 outputs corresponding to the outputs of the 8 filters assigned to the ESM function, each corresponding to one of the 8 antenna sub-arrays R1, R2, R3, R4, R5, R6, R7, R8.

The example of FIG. 6 includes 8 antenna sub-arrays. The invention applies to any number N of sub-arrays, the analogue and digital receivers then including N reception channels.

Each analogue reception channel and each emission channel may be produced using an active module of the same type as that shown in FIG. 2. In this case an active module is associated with each antenna array, as described with reference to FIG. 3. Each active module is complemented with a frequency-transposing device, in case of passage via an intermediate frequency on reception, with a filter designed for the entire operating band of the radar and with an analogue-digital converter. It is also possible to make provision for an active module including all of these functions, i.e. all of the functions described for example in FIG. 5, the filter designed for the instantaneous radar reception band then being replaced by a wideband filter designed for the entire operating band.

The digital filter may advantageously be integrated into the processing means of the radar. The hardware architecture of the emitting and receiving system of the radar is thus not or not greatly modified with respect to a conventional system. The volume of the electronics of the radar is therefore not increased.

The digital receiver 62 is followed by a unit 3 for computationally forming beams, for the radar and ESM functions, these beams being formed on the basis of the outputs of the radar filters 51 and of the ESM filters 52, respectively. This beam formation is for example achieved by means of the processing means of the radar. The latter may advantageously generate reception antenna beams in radar mode and in ESM mode independently depending on the context.

In general, at a given time, all the antenna sub-arrays are phase shifted via their active modules in order to point in the same direction ($\Theta_{el}$, $\Theta_{az}$) this resulting in antenna patterns that are all identical and of 3 dB aperture: $\Theta_{3dBel}$ and $\Theta_{3dBaz}$, $\Theta_{el}$ and $\Theta_{az}$ being angles of elevation and azimuth and $\Theta_{3dBel}$ and $\Theta_{3dBaz}$ the aperture angles of 3 dB in elevation and in azimuth.

After separation in the spectral domain, it is possible to form, at leisure and separately in the radar and ESM reception channels, new beams obtained from linear combinations of the N reception channels.

Many combinations are possible, depending on the context and the mission to be accomplished:

The radar beams and ESM beams may be focused in the same direction and with the same antenna pattern. It is possible, for example, simply by computing the direct sum of the signals received over the N channels, to form a very directive beam in this direction in order to benefit from maximum sensitivity. It is also possible to create amplitude-comparison monopulse channels in order to obtain a very precise direction of arrival for the ESM and radar signals;

The radar beams and ESM beams may be focused in the same direction, but with different apertures. It is possible, for example, to form very directive radar beams and less directive ESM beams so as to allow a wider angular coverage in this mode. It is also possible in this configuration to distribute the various ESM beams of the different frequency sub-bands in order to increase the probability of interception or decrease overall computational volume;

It is possible, if the antenna supports multiple polarizations, to simultaneously receive, with various sub-arrays of the antenna, the ESM signals in various polarizations in order to estimate this polarization, which is an important discriminating parameter;

When the radar and ESM functions are performed sequentially, it is possible to apply an ESM function over a very wide angular aperture, by limiting reception to a few rows or a few columns of active modules, all of the activated radiating elements forming an interferometry base intended to estimate the direction of arrival in a wide field.

Figure 7:
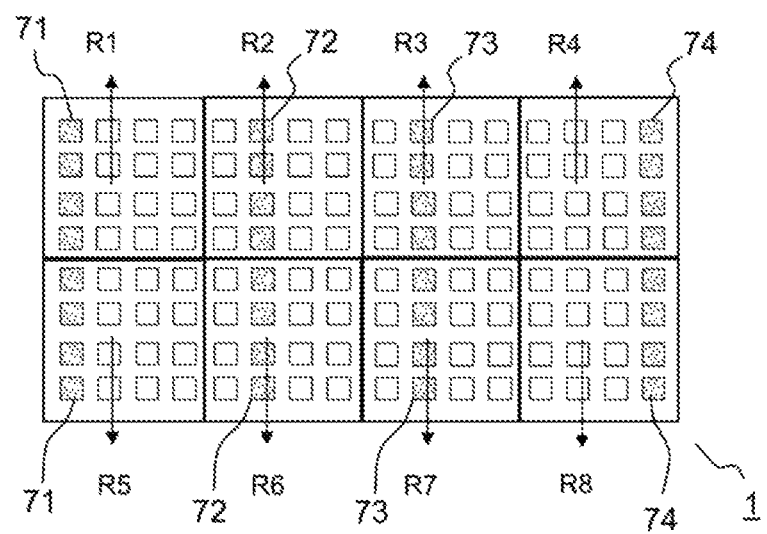
FIG. 7, an example of an activation configuration of the sub-arrays of said antenna.

FIG. 7 shows the latter configuration, only four columns 71, 72, 73, 74 of radiating elements of the antenna array 1 being activated for reception, the reception channels of the other elements being deactivated. In FIG. 7, this configuration is illustrated with the example antenna comprising 8 sub-arrays of FIGS. 3 and 6.

In the example configuration of FIG. 7, the active radiating elements are grouped in columns though of course they could be grouped in rows. The instantaneous field of coverage of the antenna may be widened without forming such groups, simply by deactivating a plurality of subgroups receptionwise. A sub-array is deactivated receptionwise by deactivating its associated reception channel. A reception channel is deactivated, simply and in a known way, by inhibiting the reception of the signals by said channel, for example via control of the circulator 40.

The invention advantageously allows a wideband multi-channel digital receiver to be integrated into a radar having an active antenna comprising a plurality of reception channels, in order to allow both radar-detection and ESM functions to be performed simultaneously or sequentially without increasing the volume of the electronics of the radar, and without lowering the detection performance of either one of these functions.

The invention also has other advantages.

The RESM receiver may operate during the emission of the radar.

The fields of angular coverage and the sighting directions of the radar and ESM may be identical or different, and automatically managed dynamically.

The reception frequencies of the two functions may be managed automatically so as to optimize the probability of interception of each of the functions.

The sensitivity of the RESM function is extremely high, because it benefits from the high antenna-array gain of the radar. For the same reasons, the estimation of the direction of arrival in RESM mode is extremely precise.

It is possible by pointing the radar antenna in the direction of a target, to receive the radar emissions emitted by this target, in order to obtain a classification or even an identification thereof, by associating the signature of the radar with which the target is equipped, with the electromagnetic signature of this target.

In the case where the radar antenna supports multiple polarizations, it is possible in ESM mode to receive in a given direction and simultaneously in various polarizations, thereby allowing the polarization of the emitter to be identified without ambiguity.

In the case of a 2D electronically scanned antenna, the RESM is capable of measuring the direction of arrival of the emitter in 2D.

Lastly, the invention is easy to implement with digital processing means according to the prior art.

The invention claimed is:

1. A receiving device for a radar having an electronically scanned antenna array, said receiving device comprising an analogue reception filter, said receiving device implementing digital filtering able to separate received signals depending on frequencies of the received signals, said analogue reception filter being configured for an entire operating frequency band of said radar, said digital filtering comprising a digital filter configured for an instantaneous frequency band of said radar and a digital filter covering an available remainder of said entire operating frequency band, one portion of said entire operating frequency band being allocated to a radar reception function and another portion being allocated to a radar electronic support measures (RESM) reception function.

2. The receiving device according to claim 1, wherein said antenna array is divided into sub-arrays, and
wherein the receiving device includes a plurality of reception channels, each of said reception channels being associated with one sub-array of said antenna array.

3. The receiving device according to claim 2, wherein said reception channels are combined to form independent reception antenna beams for the radar reception function and the RESM reception function.

4. The receiving device according to claim 3, wherein said reception antenna beams formed for the radar reception function and for the RESM reception function are identical and point in the same direction.

5. The receiving device according to claim 2, wherein a plurality of sub-arrays of said antenna array are assigned to a plurality of different frequency sub-bands of the RESM reception function.

6. The receiving device according to claim 2, wherein at least one sub-array of said antenna array is able to be deactivated receptionwise in order to widen an instantaneous field of coverage of the RESM reception function, said at least one sub-array being deactivated by deactivating at least one of the plurality of reception channels that is associated therewith.

7. The receiving device according to claim 2, wherein, the antenna array comprising radiating elements that are associated with active modules, the active modules of a plurality of sub-arrays of said antenna array are able to be deactivated receptionwise in order to allow an interferometry base to be created for measuring directions of arrival of signals in the RESM reception function, a sub-array being deactivated by deactivating the reception channel that is associated therewith.

8. The receiving device according to claim 7, wherein the radiating elements of the sub-arrays associated with the remaining active modules are grouped in columns and/or in rows.

9. The receiving device according to claim 2, wherein the receiving device, in each reception channel associated with a sub-array of said antenna array, comprises at least: in the analogue domain, a low-noise amplifier, a filter configured for said given frequency band, and an analogue-digital converter; and in the digital domain, the digital filter configured for the instantaneous frequency band and the digital filter covering the available remainder, input signals of said digital filters being output from said analogue-digital converter.

10. The receiving device according to claim 9, comprising, for each reception channel, circuits for transposing the frequencies of the received signals upstream of an analogue converting circuit.

11. The receiving device according to claim 10, wherein each of the reception channels is analogue and integrated into a module further including an emission channel that is also associated with said sub-array.

12. The receiving device according to claim 10, wherein said digital filters are implemented via a processing means of said radar.

13. The receiving device according to claim 1, wherein the RESM reception function is simultaneously provided in different polarizations by a plurality of sub-arrays of said antenna array.

14. The receiving device according to claim 1, wherein the radar reception function and the RESM reception function are able to be performed simultaneously.

15. A radar, comprising a receiving device according to claim 1.

* * * * *